United States Patent [19]

Littmann et al.

[11] Patent Number: 4,951,768
[45] Date of Patent: Aug. 28, 1990

[54] MODULAR ARTICULATED VEHICLE MANOEVRING AMONG OBSTACLES AND MODULAR MEMBER INCORPORATED IN SAID VEHICLE

[75] Inventors: François Littmann, Montigny le Bretonneux; Eric Villedieu, Palaiseau, both of France

[73] Assignee: Commissariat a l'energie Atomique, Paris, France

[21] Appl. No.: 230,062

[22] Filed: Aug. 9, 1988

[30] Foreign Application Priority Data

Aug. 28, 1987 [FR] France .................. 87 12029

[51] Int. Cl.$^5$ ................. A63H 17/00; B62D 37/00
[52] U.S. Cl. ......................... 180/14.1; 180/41; 180/65.5; 280/5.2; 280/6.1; 280/408; 280/458
[58] Field of Search .............. 280/458, 460.1, 461.1, 280/408, 840, 6.1, 5.2; 180/14.1, 65.5, 41; 305/4, 5

[56] References Cited

U.S. PATENT DOCUMENTS

| | | | |
|---|---|---|---|
| 3,246,714 | 4/1966 | Middlesworth et al. | 180/14 |
| 3,376,945 | 4/1968 | Kaprelian et al. | 180/14.1 X |
| 3,504,753 | 4/1970 | Rutley | 280/408 |
| 4,127,202 | 11/1978 | Jennings et al. | 214/85 |
| 4,674,585 | 6/1987 | Barlow et al. | 180/14.1 |

FOREIGN PATENT DOCUMENTS

1368678  6/1964  France .

Primary Examiner—Charles A. Marmor
Assistant Examiner—Michael Mar

[57] ABSTRACT

Modular element of module (M) for an articulated vehicle formed therefrom. The vehicle must be able to travel over various obstacles (corridors, staircases, level changes). The modules (M) are joined by double hinges (20) and have internal degrees of freedom (flexible chassis, twisting displacement, adjustment of the pitch of the load 69), so that the vehicle is given flexibility and stability. The vehicle is intended to operate in hostile or dangerous environments.

7 Claims, 12 Drawing Sheets

MODULAR ARTICULATED VEHICLE MANOEVRING AMONG OBSTACLES AND MODULAR MEMBER INCORPORATED IN SAID VEHICLE

DESCRIPTION

The present invention relates to a modular articulated vehicle manuevering among obstacles, as well as to a modular member used in the construction of said vehicle.

Various vehicles have already been designed to permit travel in difficult or hostile environments, such as the ocean bed, the surface of planets in the solar system, nucleur or polluted enclosures, underground stations, etc. Such environments are characterized by the presence of difficult passages, which can be undulations of the ground, severe slopes, staircases, level changes, confined corridors, sharp turns and angles. If it is wished to limit the overall width dimensions of these vehicles in order to enable them to manuever in confined passages, as well as the height dimensions in order that they retain a good stability which is jeopardized in the case of slopes, then it will be necessary to spread out their load length wise, so that a construction formed from articulated modules is then necessary to enable the vehicle to turn.

The frequently used caterpillar vehicles and even those equipped with four caterpillars projecting to the front and rear of the vehicle and which pivot about transverse axes, thus modifying the angle which they form with the vehicle body, particularly for taking a change of slope, are consequently inadequate as a result of the longitudinal overall dimensions resulting from the presence of such caterpillars. Moreover, they consume a large amount of energy and do not turn very well due to the significant and differing friction, which is difficult to evaluate on each caterpillar.

French Patent No. 2 306 976 proposes a completely difficult vehicle, called an "earthworm" because of its displacement by peristaltism. Modules resting on the ground by pads are connected by articulated systems formed by means operated by 3 jacks. Each articulated system contracts in turn in order to draw the module to which it is connected at the rear towards the front while slightly raising the same from the ground. The adjacent articulated system located to the rear of the raised module and which has contracted immediately beforehand to the same extent is simultaneously elongated and reassumes its initial state. The raised module then comes into contact again with the ground and the module located immediately to the front undergoes identical operations. Displacement takes place gradually along the vehicle.

This "earthworm" has a good stability and adequate flexibility to enable it to enter twisting corridors. It is also possible to use its rear part as a support for raising the front and clear an obstacle without having contact therewith. However, the peristaltic locomotion is slow and the articulated systems are complicated and have large dimensions.

Another vehicle design uses modules on wheels connected by elastic or flexible bars. This articulation method is purely passive, without any possiblity of intervention or control, whilst the overall system is too flexible due to the excessive number of passive degrees of freedom.

The vehicle according to the invention does not suffer from these various disadvantages and combines the advantages of locomotion of wheels, namely robustness, speed and low energy consumption, with those resulting from a careful distribution of the degrees of freedom and a particularly simple articulation between the modules constituting the same. The vehicle considered as a whole can be both flexible or rigid, so that it can clear the most varied obstacles. However, the vehicle according to the invention has these advantages due to modules or modular elements constituting the same, which also have an original design and constitute a further object of the invention.

The articulation chosen for joining the modular elements is that adopted in U.S. Pat. No. 4,127,202. However, although the prior art vehicle has a very good flexibility on the road, it is not able to travel vertically on staircases or over obstacles, as the present invention proposes to do.

The present invention therefore relates to an articulated vehicle modular element having a generally rectangular chassis and front, rear, left and right portions, two transverse concurrent axles, each of which carries a wheel and rotating independently in bearings located respectively on the left and right portions, as well as a disengageable motor mechanism acting on the wheels and four vertically axed articulations located at the left and right ends of the front and rear portions for receiving articulated bars for coupling with similar adjacent modular elements.

The modular element also comprises a platform rotating about axles in two bearings with respect to the chassis, as well as to a regulating system, incorporating a motor and a detector of said rotation.

The chassis comprises two parts articulated to one another about an axis parallel to that of the axles in accordance with a variable deformation angle, said axis then preferably coinciding with the axis of the axles.

In a special embodiment, the articulations for articulated bars are located on front and rear cross-beams, whereof one pivots with respect to the chassis about a horizontal axis perpendicular to the axles and located midway between the right and left articulations.

In order to facilitate maintenance of the modular element and keep the median transverse space for the useful load, the wheels have a wide rim connected to the axle by a solid disk located outside the rim, the motors then being located in the hollow volume defined by the rim and the disk, where they are protected and sheltered.

The invention also relates to a vehicle consisting of several of these modular elements assembled in chain-like manner so as to define a head element, a tail element and intermediate elements, couplings assembling the elements and each consisting of two bars articulated to the two ends, a first bar on the left articulation of the rear portion of the chassis of a front vehicle element and to the right articulation of the front portion of the chassis of a rear vehicle element, a second bar on the right articulation of the rear portion of the chassis of the front vehicle element, and on the left articulation of the front portion of the chassis of the rear vehicle element, and an overall control system making possible to act on the motors and control their disengagement.

The invention is described in greater detail hereinafter relative to non-limitative embodiments and the attached drawings, as follows.

FIGS. 12A to 12I inside view the articulated vehicle when clearing a raised obstacle.

FIGS. 13A to 13D a vehicle in the process of straightening after turning.

Figure 1:
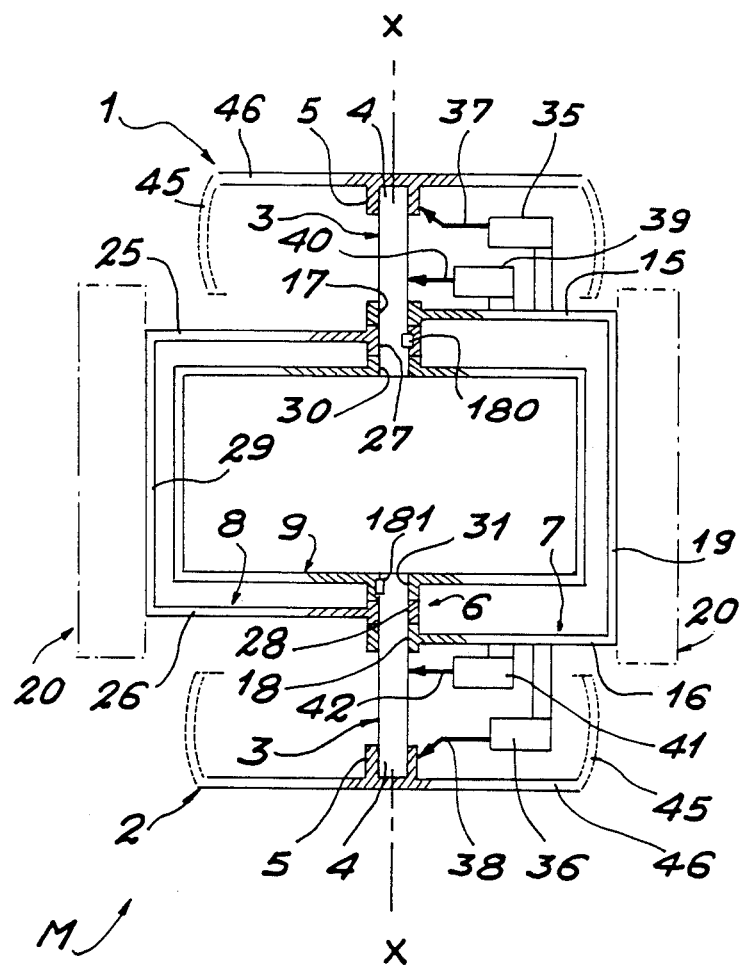
FIG. 1 is a diagrammatic plan view of a modular element.

The modular element of module M of FIG. 1 is consisting of several main parts, namely two wheels 1,2 with the same rotation axis X and located to the left and right of the module M, two axis 3, whereof one end 4 constitutes the stub axle in which the hub 5 of each wheel 1 or 2 is inserted and rotated, a chassis 6 formed from two parts 7 and 8, called the front chassis and rear chassis and both of which are able to rotate about axles 3, as well as a platform 9 also rotating about axles 3.

Chassis 6 has a generally rectangular contour, the front chassis 7 being constituted by two longitudinal, symmetrical beams 15,16 provided at one end with a respective bearing 17 and 18 enabling them to rotate about an axle 3 and joined at their other end by a crossbeam 19, slightly projecting beyond the front of chassis 6 and carrying a hinge 20 to which reference will be made hereinafter.

The rear chassis 8 is also constituted by two longitudinal symmetrical beams 25 and 26 provided at one end with a respective bearing 27,28 enabling them to rotate about an axle 3 and joined at their other end by a crossbeam 29, which projects slightly to the rear over the wheels 1 and 2 and which also carries a hinge 20.

More specifically, the longitudinal beams 15,25 are located on the left-hand side of module M and longitudinal beams 16,26 on the right-hand side.

The longitudinal beams 25,26 of the rear chassis 8 are located between the longitudinal beams 15,16 of front chassis 8. Platform 9 is substantially rectangular and is located between the longitudinal beams 25,26 of rear chassis 8 on the one hand and the two cross-beams 19,29 on the other. It rotates about axles 3 by two bearings 30,31 respectively on axle 3 to the left and right. The left axle 3 is linked in rotation to the bearing 27 of rear chassis 8 by an attachment system 180 and the right axle 3 is linked in rotation to bearing 31 of platform 9 by another attachment system 181. These attachment systems 180,181 will be described hereinafter.

The left and right wheels 1,2 are moved independently, each by a disengagable wheel motor 35 or 36 by means of a transmission 37 or 38, which rotates each of the hubs 5. A chassis motor 39, which can be disengaged with the aid of transmission 40, rotates the left axle 3 and therefore the rear chassis 8. A platform motor 41, with the aid of a transmission 42, rotates the right axle 3 and platform 9. All the four motors 35,36,39,41 are fixed to the front chassis 7. The left wheel and chassis motors 35,39 respectively, as well as their transmissions are located between the front chassis 7 and the left wheel 1. The right wheel and platform motors 36,41 respectively, as well as their transmissions are located between the front chassis 7 and the right wheel 2. More specifically, because each wheel 1 and 2 comprises a relatively wide rim 45 connected to hub 5 by a solid disk (i.e. without spokes) 46, the latter being external in the transverse direction with respect to rim 45 and hub 5, the motors and their transmissions are located in the hollow volume defined by rim 45 and disk 46. They are protected and sheltered therein, but are easily accessible for maintenance, by dismantling wheel 1 or 2. Moreover, this arrangement makes it possible to devote the median transverse space to the useful load of module M carried by platform 9.

In summarizing, the front chassis 7 can be looked upon as the reference element of the module because the motors are fixed thereto. The wheel motors 35,36 ensure the displacement of the module, the chassis motor 39 regulates the angle formed by the front and rear chassis 7,8 respectively and the platform motor 41 regulates the inclination of the latter with respect to the front chassis 7.

Figure 2A:
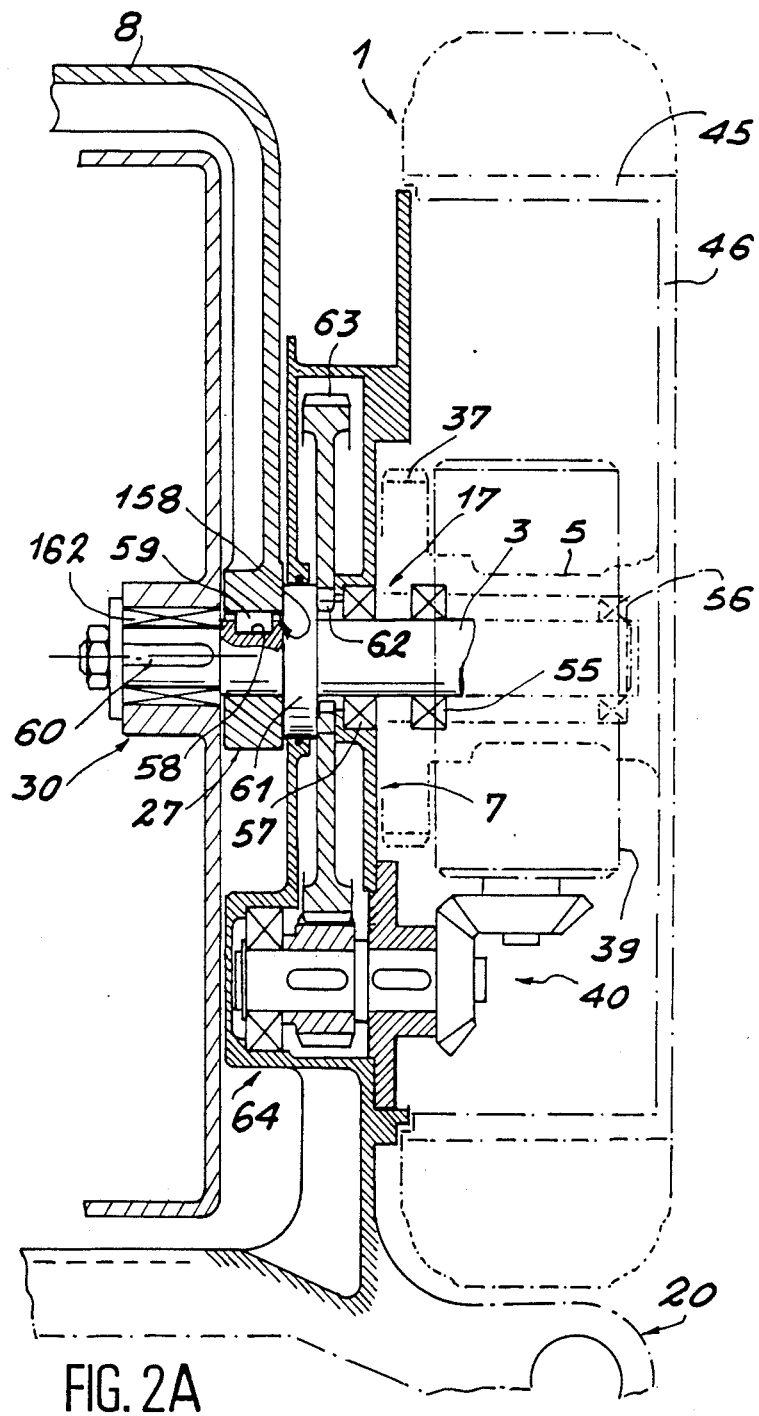
FIGS. 2A and 2B are two part sectional plan views of the close arrangement of a left and right wheel of a modular element.

FIG. 2A explains the installation of these different parts of the left axle 3. Hub 5 of left wheel 1 rotates about the left axle 3 via a bearing means with two ballbearings 55,56. A toothed wheel fixed to the hub 5 close to the front chassis 7 constitutes the end of transmission 37, the remainder of which is not shown.

The bearing means 17 of front chassis 7 comprises a ballbearing 57 between axle 3 and front chassis 7. The bearing 27 of the rear chassis 8 comprises a key 59 located in keyways 58 on axle 3 and 158 on rear chassis 8. These keyways 58 and 158, as well as the key 59 constitute the attachment system 180. Bearing 30 of platform 9 is constituted by a bearing 162 enabling the left axle 3 to rotate with respect to platform 9. However, axle 3 is provided with an unoccupied keyway 60.

Axle 3 comprises a shoulder 61 between the bearing 17,27 of the front and rear chassis 7,8 respectively. On its side face directed towards the bearing 17 of the front chassis, said shoulder is provided with teeth 62 able to maintain in place a toothed wheel 63, which is the last of the transmission 40 of the chassis motor 39, which, as can be seen in FIG. 2, is located beneath hub 5. A flange 64, bored in order to enable shoulder 61 to rotate with a clearance, in mounted on the front chassis 7 on the inner transverse side and surrounds the toothed wheel 63.

Figure 2B:
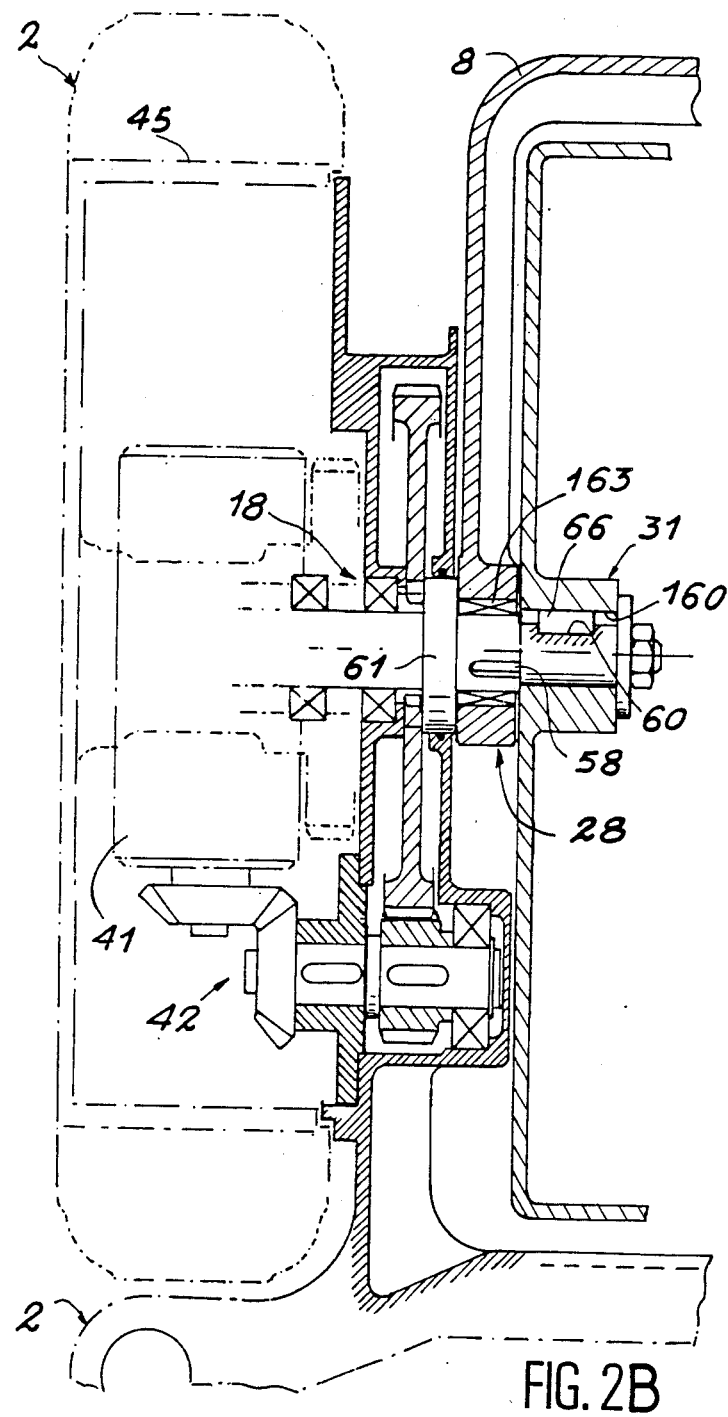

The left and right sides are almost entirely symmetrical, which is desired in order to facilitate manufacture and make the parts interchangeable. This is shown in FIG. 2B. The only difference relate to the absence of a key symmetrical to key 59. The right axle 3 is in fact attached to the rear chassis 8 by a bearing 163, which permits the relative rotation thereof. However, there is no bearing in the bearing means 31 and instead there is a keyway 160 in the bore of platform 9. A key 66 is located in keyways 60,160 and it therefore links in rotation the right axle 3 and platform 9. Key 66 and keyways 60,160 constitute the other attachment system 181.

,10 Obviously, the various numerical references in FIG. 1 introduced for distinguishing the parts and elements of a similar type located to the left and right appear once again in FIGS. 2A and 2B, but the structure of the module is symmetrical. In particular, the chassis motors 39,41 are identical and located in symmetrical points beneath the hubs 5, even though they fulfill different functions. This also applies with respect to their transmissions 40,42, as well as the wheel motors 35,36 and their transmissions 37,38, although the latter elements are not shown in FIGS. 2a and 2B.

Figure 3:
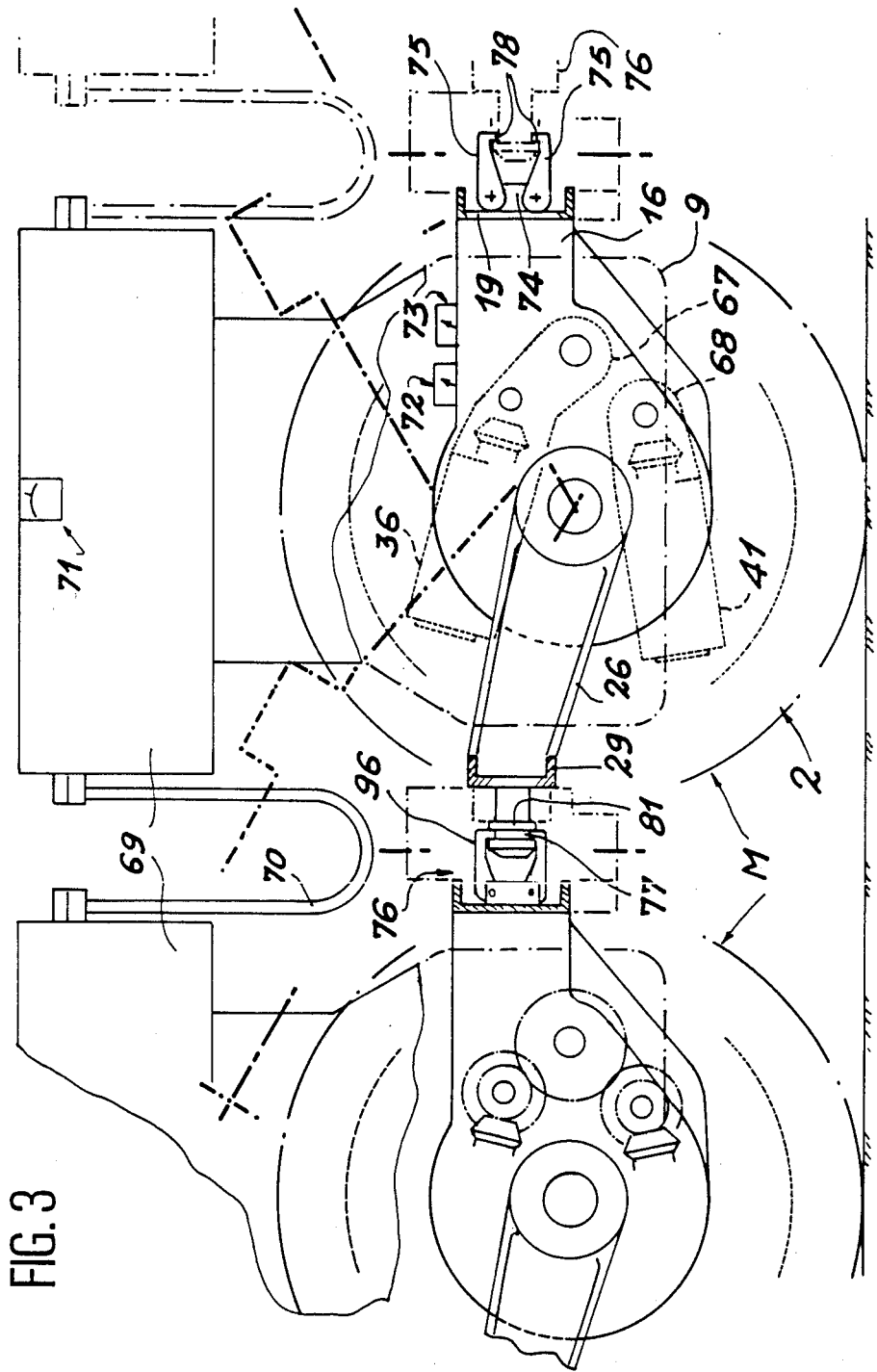
FIG. 3 is a part sectional side view of the close arrangement of a wheel of a modular element.

Reference will now be made to FIG. 3 showing several assembled modules M. The right wheel 2 is sketched, the wheel motor 36 and platform motor 41 being connected by two frames 67,68 to the right longitudinal beam 16 of front chassis 7. Platform 9 carries a useful load enclosed in a container 69 and which, as a function of the particular case, can comprise the automatic control system of the vehicle, the energy supply means, remotely manipulatable tools or the material to be carried. As appropriate, flexible cables or ducts 70 link two adjacent containers 69. In addition, pitch inclination detectors 71,72 are fixed to container 69 and front chassis 7, while a roll detector 73 is fixed to the front chassis 7. In the case of an automatic vehicle, not shown obstacle detectors are installed on the head module M. For example, they can comprise fantype infrared radiation emitters for distinguishing slope changes and front and rear proximity detectors for referencing obstacles encountered. All the aforementioned detectors are known and require no particular comment. In the same way as the various wheel 35,36, chassis 39 and platform 41 motors, they are connected to the vehicle control system by not shown electric lines.

The cross-beam 19 of front chassis 7 is provided with a boss 74 equipped with jaws 75, which can be folded down by pivoting. As can also be seen in FIGS. 7, there can be four of these and they are controlled by a system 79 dependent on the control system. Once they are folded down, they wedge the rear end of a connection 76 to the rear of the cross-beam 29 of the rear chassis 8 of the preceeding module M and which advantageously comprises a groove 77 penetrated and rubbed against by the curved ends 78 of jaws 75.

Jaws 75 folded down on connection 76 make it possible to block the direction (yaw) angle formed by the two modules M in question and makes any turning impossible. The usefulness of this arrangement will become apparent hereinafter.

Figure 4:
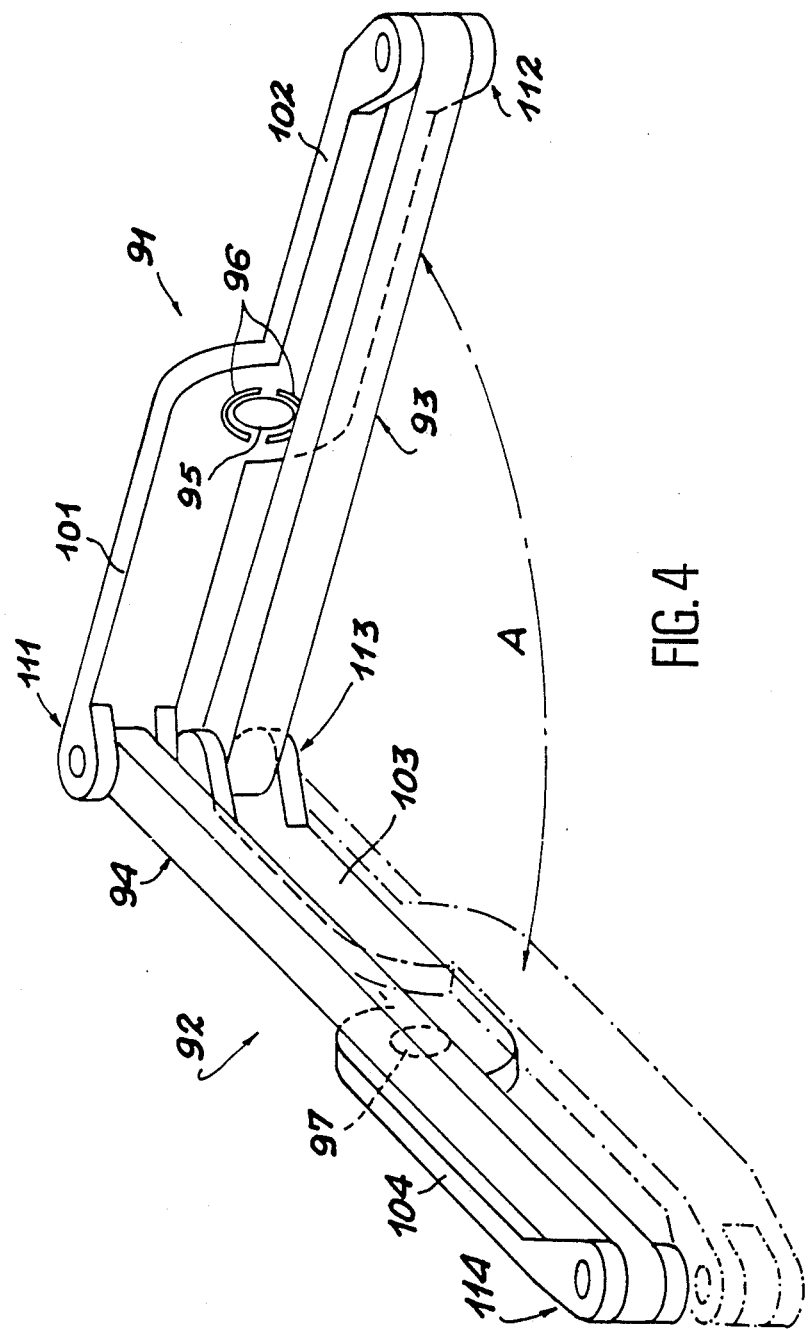
FIG. 4 is a perspective view of a hinge used for the articulation of two adjacent modular elements.
Figure 5:
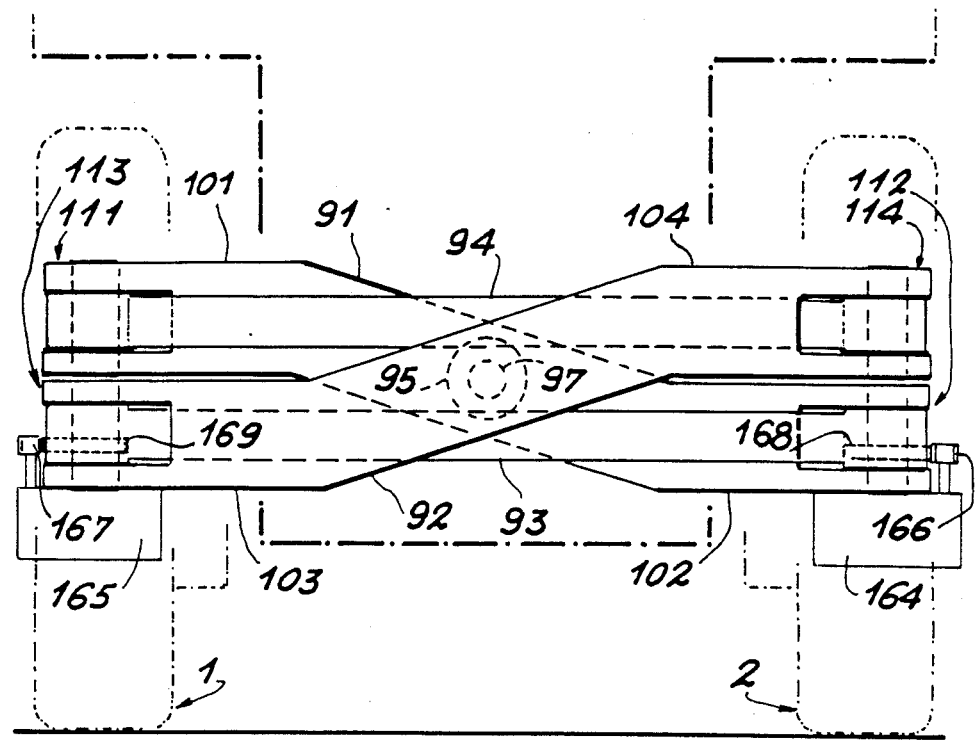
FIG. 5 is a longitudinal view of the hinge.
Figure 6:
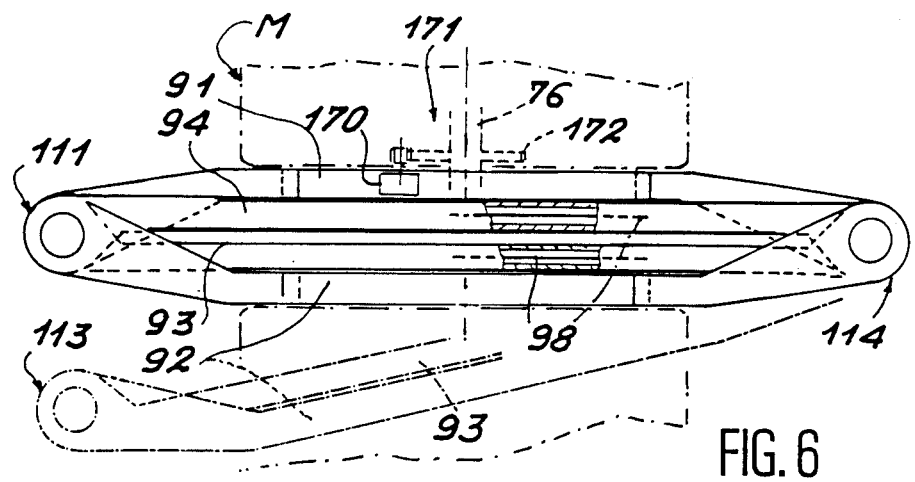
FIG. 6 is a plan view of the hinge.

In normal time, the connection between two adjacent modules M is ensured by a hinge 20 illustrated in detail in FIGS. 4, 5 and 6. It comprises two bent bars 92,91 and two rectilinear connecting bars 93,94. A bent bar 92 is rigidly fixed to the cross-beam 19 of front chassis 7 of a module M, while the other bent bar 91 can be connected to connection 76 of the immediately preceeding module M by an attachment permitting a roll rotation. For example, connection 76 is introduced through a hole 75 in the center of the bent bar 91, after which two half-rings 96 are installed on the front face of bent bar 91 in order to bring about a narrowing of hole 95 and thus maintain a shoulder 81 of connection 76 to the rear of the two half-rings 96. A second hole 97 faces the aforementioned hole on the other bent bar 92 to permit the passage of jaws 75.

The bent bars 91,92 have in fact two horizontal portions joined around holes 96,97 by a vertical or oblique part.

The left horizontal portion 101 is consequently slightly above the right horizontal portion 102 in the case of bent bar 91, but the right horizontal portion 104 is slightly above the left horizontal portion 103 in the case of the other rear bent bar 92. The four horizontal portions 101 to 104 are in each case provided with a yoke 111 to 114 at their free end. These yokes 111 to 114 extend frontwards for the bent bar 92 and rearwards for the bent bar 91 and pivotably receive the ends of the rectilinear bar 93 for yokes 112,113 and the other rectilinear bar 94 for yokes 111 and 114.

As can be gathered from the drawings, two yokes necessarily remain superimposed, i.e. the separation of the two modules M is prevented. According to FIGS. 5 and 6 (continuous line), yokes 111 and 114 can be above yokes 113 and 112 respectively and this is the case when modules M move in a straight line. According to FIG. 4, yoke 111 can be above yoke 113, whereas yokes 112, and 114 are spaced apart, the former remaining integral with module M at the front and the latter remaining integral with module M at the rear. This is the case when the vehicle turns to the left. Another configuration is shown by dotted lines in FIG. 6, which corresponds to the case where the vehicle turns to the right and according to which the yokes 112,114 are superimposed, whereas yokes 111 and 113 are spaced apart.

Thus, hinge 20 is a rigid attachment of the two modules M in translation, but authorizes vehicle turning except when the jaws 75 are folded down and applied against connection 76. As the yokes 111 to 114 are located just behind wheels 1 and 2, there are few dimensional constraints and the bent bars 91,92 can in principle open until an opening angle A is formed, or a yaw angle between the two modules M (FIG. 4), for which the modules M joined by hinge 20 are wheel to wheel. In practice, the forces transmitted by hinge 20 make the modules M turn without any sudden angular velocity jumps and it is to be expected that the opening angles A will not exceed 90°, which permits turns with a very small radius of curvature making the vehicle able to clear angles in corridors.

Hinges 20 can also be used for containing and protecting cables or leads 98 joining two adjacent modules M. The cables or leads 98 then pass through the interior of one of the linear bars 93 and 94 and pass out at their ends.

Hinges 20 can optionally be equipped with actuators or disengageable transmission motors. For example, two motors 164,165 are fixed beneath yokes 112,113 respectively to the bent bars 91,92. Each actuates a disengageable transmission 166 or 176 at constituted by toothed wheels meshing a toothed ring 168 or 169 at each end of the lower horizontal bar 93. When the motor 164 (165) is started up, it consequently modifies the angle between the bent bar 91 (92) and the lower horizontal bar 93. A motor 170 can also be located to the front of the front bent bar 91 to act by means of a disengageable transmission 171 of a toothed ring 172 on connection 76. Thus, motor 170 makes it possible to modify the roll angle between the two modules M between which it is installed.

Generally, motors 164,165 and 170 are inoperative with their transmissions disengaged in order to respect the flexibility of the attachment by hinges 20 and their interest in certain cases will be explained hereinafter.

Figure 7:
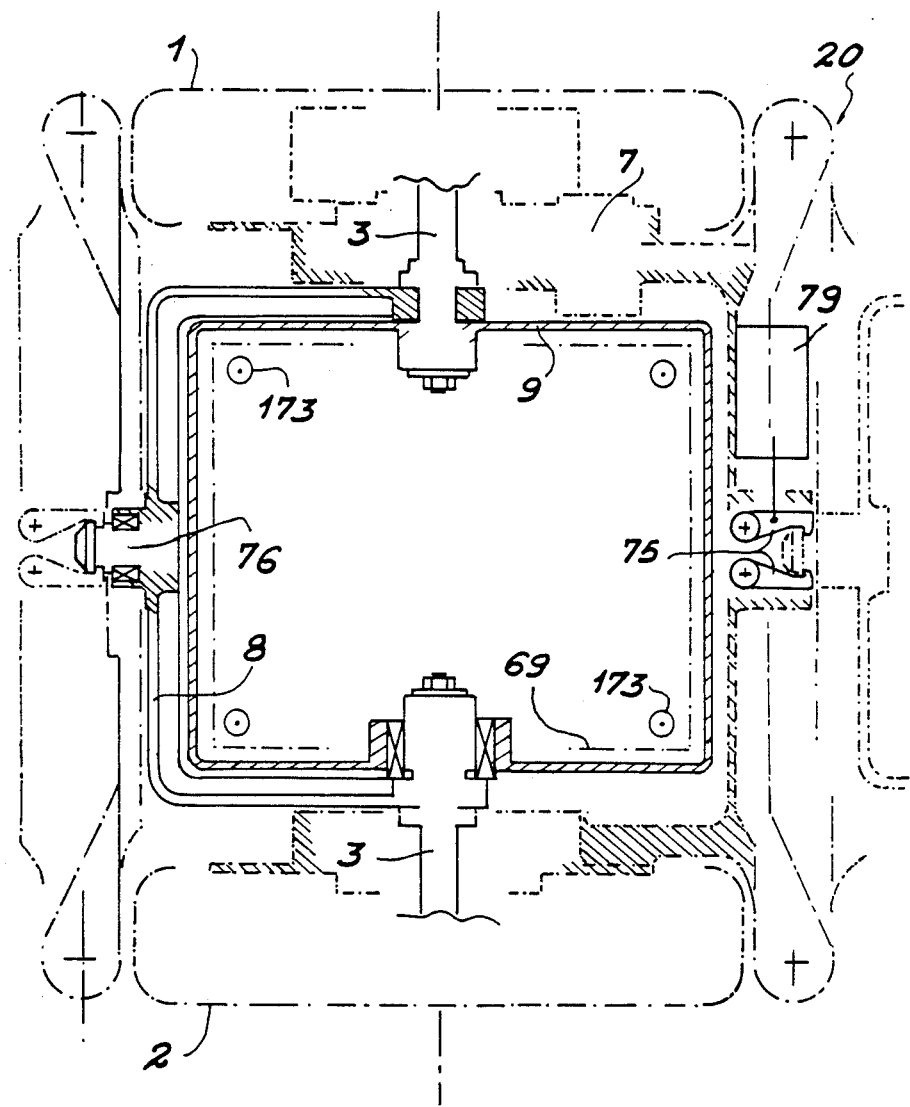
FIG. 7 is a synthetic plan view of different large parts of a modular element.

FIG. 7 is a profile giving the proportions of the module M in an effective realisation and which makes it possible to appreciate its compactness and the absence of unused volume.

The surface occupied by module M is roughly square and no attachment projects beyond it.

Container 69 can be placed on platform 9 via four suspension elements 173 located at the four corners of a square container 69 and which can be passive (springs) for filtering shocks and vibrations or active (jacks) to laterally incline the container 69 and maintain it vertical if wheels 1 and 2 are not at the same level.

Figure 8:
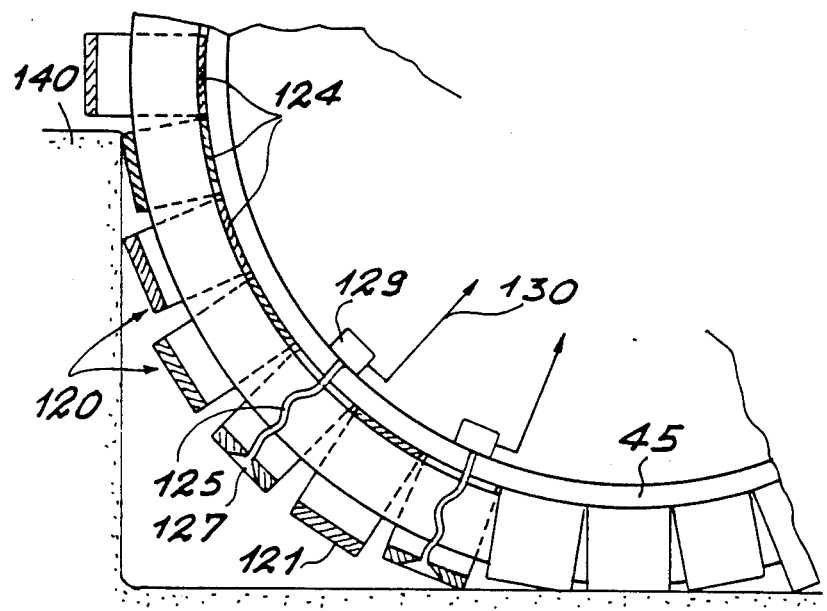
FIG. 8 is a side section of a modular element wheel.
Figure 9:
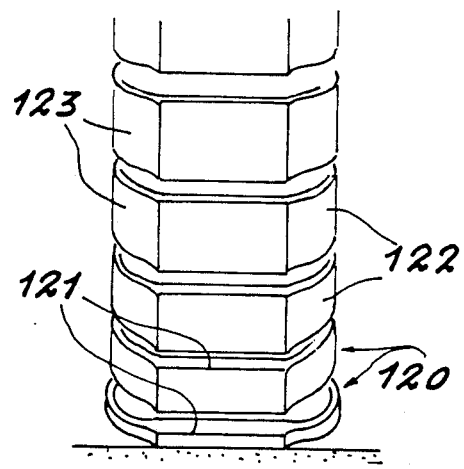
FIG. 9 is a front view of said wheel.

FIGS. 8 and 9 illustrate the construction of wheels 1 and 2. Rim 45 is externally provided with rolling or running elements 120 formed by a base plate 121 coming into contact with the ground, two elastic transverse flanks 122,123 and a fixing bearing surface 124, fixed to rim 45 and connected to base plate 121 by the two flanks 122,123.

Certain of the rolling elements 120 can receive a suction cup 127, which is then installed in a central recess of base plate 121. A flexible suction tube 128 connects the suction cup 127 to a pump 129 located on the inner face of rim 45. The fixing bearing surface 124 and the rim 45 are perforated so as to permit the passage of the flexible suction tube 128. Pump 129 is controlled by a line 130 connecting it to the control system and which passes through the interior of rim 45 and the solid disk 46 of wheel 1 or 2 to join axle 3.

Rolling elements 120 deform under the weight of the module M when they come into contact with the ground and must therefore have an adequate strength and elasticity, particularly the transverse flanks 122,123 exposed to the bending action. Thus, the latter are made from steel. The base plates 121 have a steel mount, whereof the part in contact with the ground is coated with a non-skid layer of elastic material having carvings.

Moreover, the rolling elements 120 are useful for bearing on nosing planes 140, with which they come into contact via the rear of base plates 121 and the flanks 122,123. They must consequently be strong enough to permit the raising of module M from the ground.

Suction cups 127 are provided for increasing adhesion with the ground of the vehicle constituted by several assembled modules M in the case of a severe gradient on a smooth ground surface (window or wall).

These rolling elements 120 constitute a preferred, but not the only embodiment of the invention. It is obvious that it is also possible in many cases to use ordinary pneumatic tires. For certain ground surfaces, tires equipped with teeth, studs or hooks are advantageous in order to assist ground adhesion, in the same way as the suction cups 127.

A description will now be given of the operation of the articulated vehicle formed by the assembly of several modules M with the aid of the drawings. It must be remembered that the wheel motors 35,36 operate independently and that they, as well as the chassis motor 39, can be engaged or disengaged at random. In general terms, the operation of the vehicle takes place automatically by an on-board control system, which reacts to the readings of transducers and which incorporates a computer.

Figure 10:
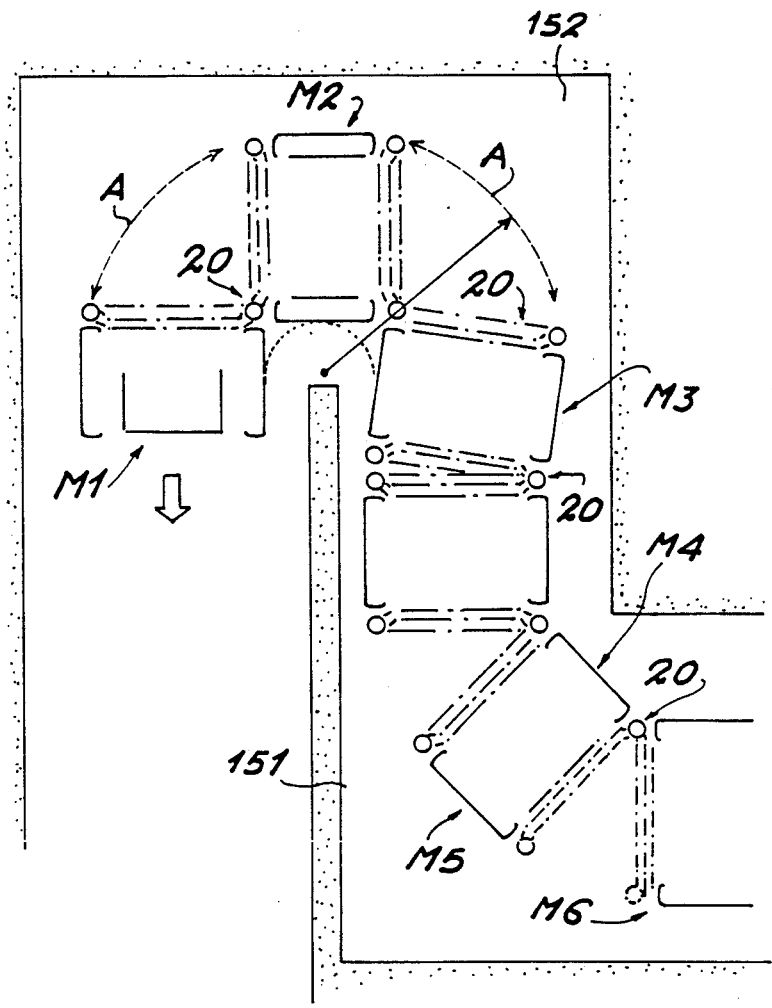
FIG. 10 is a plan view of an articulated vehicle formed from several modular elements when clearing successive corners.

In the case of FIG. 10, the vehicle is formed by six modules M1 to M6, M1 designating the first or head module M and M6 the sixth or tail module M (modules M2, M3, M4 and M5 are called intermediate modules). The vehicle has to travel in a corridor successively having a quarter-turn to the right 151 and a half-turn to the left 152. The width of the corridor is approximately 1.5 or 2 times greater than the width of modules M. It is obvious that it is not difficult to clear such an obstacle. In this case the head module M1 has passed the half-turn to the left 152 as a result of a slowing down of the left wheel 1 and the third and fourth modules M3 and M4 are still between the quarter-turn to the right 151 and the half-turn to the left 152. Their displacement direction is opposite to that of the head module M1. The second module M2 has roughly completed half the half-turn to the left 152 and its displacement direction is intermediate between those of the head module M1 and the third module M3. The tail module M6, which has not yet effected the quarter-turn to the right 151, has roughly the same displacement direction as the second module M2 and the fifth module M5 in the quarter-turn to the right 151 has a displacement direction intermediate between those of the fourth and sixth modules M4 and M6.

It is possible to see the considerable flexibility of the vehicle which, no matter what its length, can take a turn with a very small radius of curvature. This is due to the hinges 20 and their great opening possibilities which, connecting the second module M2 to the head module M1 and third module M3 are in this case simultaneously opened by an angle A close to a right angle.

A remarkable feature is linked with the fact that only the wheel motors 35 and 36 of the head module M1 are controlled and active. The other modules M2 to M6 follow in passive manner, like trailers, under the action of hinges 20, but the wheels can be motive and not controlled by a central system. Thus, they can react to the contact forces with the ground and their rotation speed can be regulated interactively in such a way that they do not slip. In spite of this, all the modules substantially follow the head module M1, which is vital in the case of constricted corridors, where friction against the walls would lead to damage or even to the blocking of the vehicle. This advantage is also due to the hinges 20, which operate as simple pivots, whereas coupling means constituted by a central cable or bar would not permit this.

Figure 11:
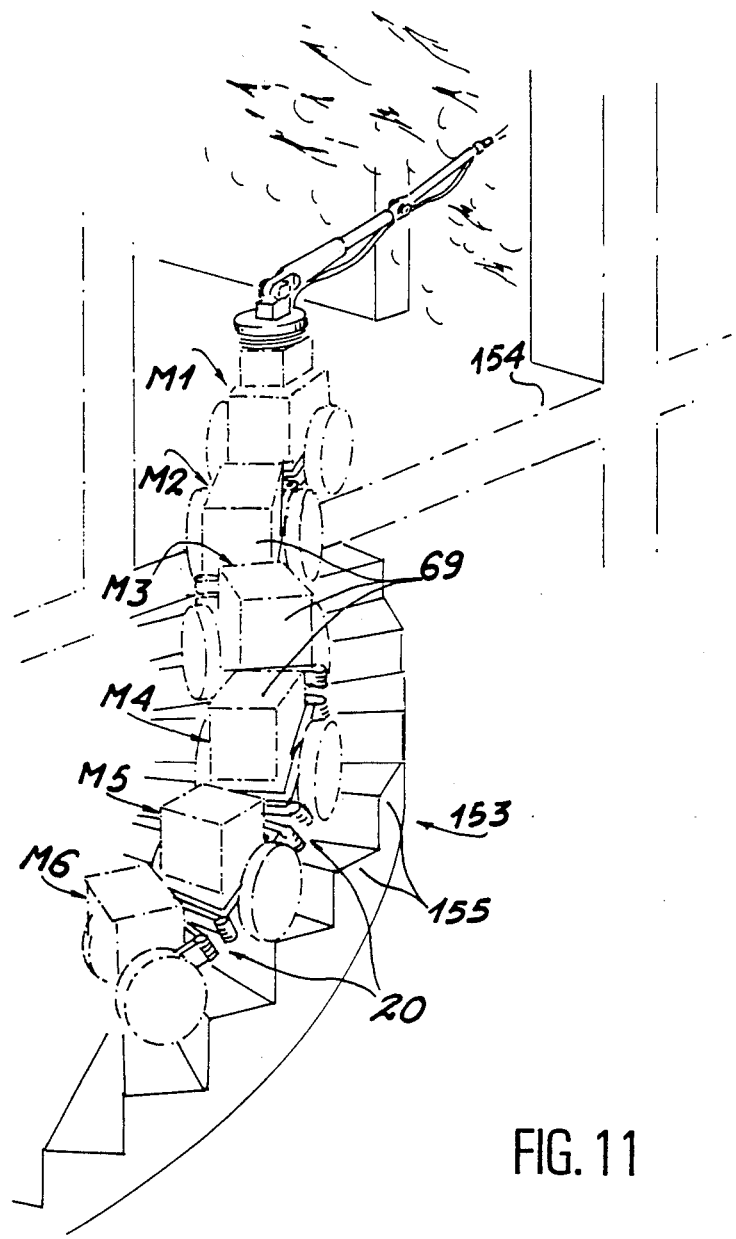
FIG. 11 is a perspective view of the articulated vehicle when travelling up a staircase.

FIG. 11 shows a different operating case. In this case the vehicle is in the process of clearing a spiral staircase 153 terminated by landing or stair head 154 which has already been reached by the head module M1. It is important to have an adequate power and it is for this reason that the wheel motors 35 and 36 are put into action in several modules M at once, in accordance with decisions taken by the control system.

The different modules M clear a stair 155 of staircase 153 at different times and their wheels 1 and 2 can even clear a single stair 155 with a time lag, which is the case here for the second module M2, which must take a turn to the right just prior to arriving on the stair head or landing 154. It is therefore necessary to have degrees of roll freedom between modules M, which justifies the existance of connections 76 rotating in holes 95. Moreover, the chassis motors 59 are all disengaged, so that the angles of the front and rear chassis 7,8 respectively of all the modules M can vary constantly, while differing from one another.

The platform motors 41 are put into operation in order to constantly correct the inclination of load 69 with the aid of the pitch detector 71. Thus, it is essential that container 69 is vertical with respect to the axles 3, in order to ensure vehicle stability in the case of such difficult manuevers.

FIGS. 12A to 12I explain the clearing of a local, steep obstacle. A duct 156 is positioned above the floor and ground and perpendicular to the displacement of the vehicle 12A. The gap between the floor and duct 156 is inadequate to enable the vehicle to pass beneath the latter. The control system then acts on the chassis motor 39 of the second module M2, so as to raise its front chassis 7 and raise the head module M1 from the ground 12B. Then, identical actions are carried out on the chassis motors 39 of the following modules M3, M4, M5 etc. Head module M1 finally rises above duct 156 (12C) and passes above, because the forward travel of the vehicle continues. The chassis motors 39 of the first modules M2, M3 etc are then put back into action in the reverse direction in order to lower the front chassis 7, which had been raised first (12D). This procedure continues until the head module M1 is lowered and finally comes into contact with the floor beyond duct 156 (12E).

The tail modules can be raised from the ground or floor, when there is an adequate bearing support to the front of the vehicle (12F). They then clear the obstacle (12G) before finally being lowered (12H). During these operations, the container 69 of modules M are still kept vertical, except if an adjacent module overhangs excessively, in which case the container 69 in question is inclined, e.g. that of module M3 in FIG. 12G so as to lower it and thus prevent impact with the wheels or chassis of the overhanging module.

Figure 12A:
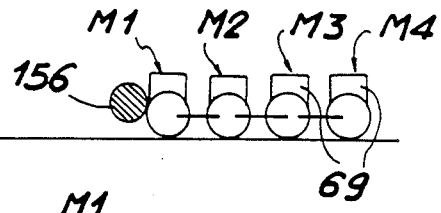
Figure 12B:
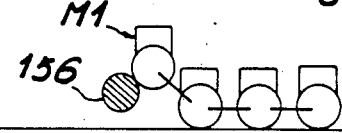
Figure 12C:
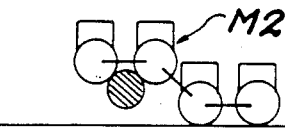
Figure 12D:
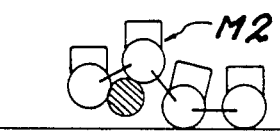
Figure 12E:
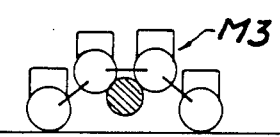
Figure 12F:
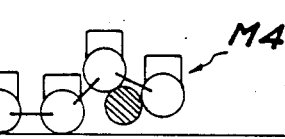
Figure 12G:
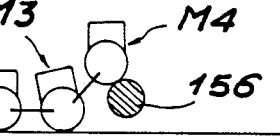
Figure 12H:
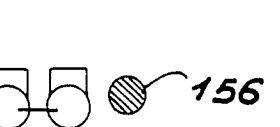
Figure 12I:
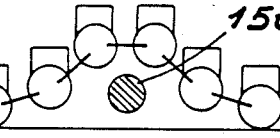

Thus, the modules M are successively raised above the duct 156 with the aid of the adjacent modules. The vehicle appears like an arch enveloping the obstacle. In FIG. 12I it is assumed that the wheels of the raised modules do not come into contact with the obstacle to be cleared, in this case duct 156. However, in order to improve the overall stability and reduce stresses, it is also possible to permit them to rest there as in the case of FIGS. 12A to 12H, which show a vehicle with four modules instead of the six in FIG. 12I. The head module M1 is then progressively lowered when it starts to overhang the obstacle until it touches it, before continuing the lowering again thereof when it has cleared the obstacle. The remainder of the process is unchanged.

However, this method of clearing obstacles, which is also usable for a wall, rails, or a narrow, deep trench (in the latter case it is obviously pointless to raise the modules M), requires an adequate number of modules M to maintain the stability of the vehicle in the initial or final phases, when it only rests on the ground at one end. It is also necessary to maintain the stability of the raised modules by locking connections 76 by jaws 75, as well as by acting on the platform motor 41 to keep the container 69 as vertical as possible, as is the case with respect to FIG. 11.

Figure 13A:
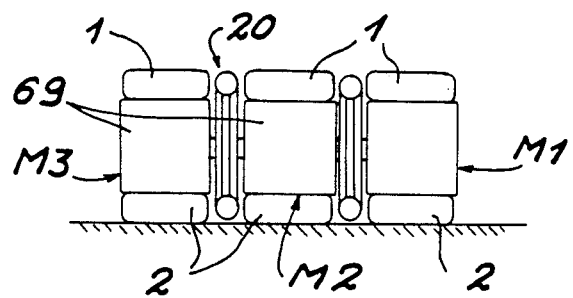
Figure 13B:
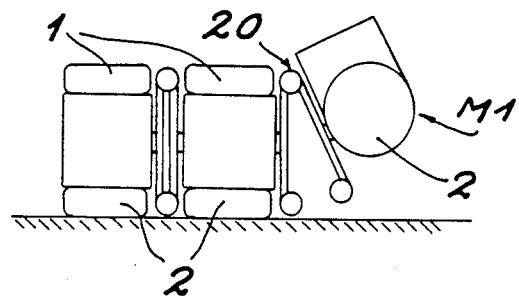
Figure 13C:
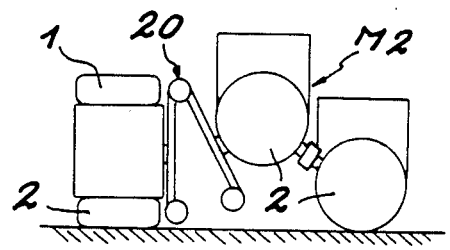
Figure 13D:
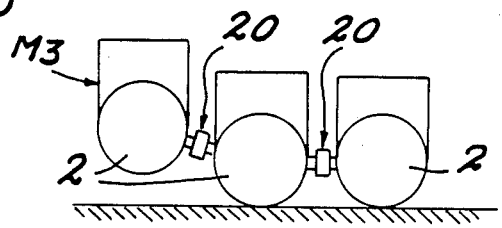

For certain uses, it is necessary to take account of risks of the vehicle turning over on the side. The modules M are then necessarily equipped with actuators on the degrees of roll and yaw freedom. In FIG. 13A the vehicle has turned to the right. The motors installed on hinge 20 make it possible to straighten it in sequence. The motor 165 to the left, beneath yoke 113, of hinge 20 joining the head modules M1 and M2 is actuated in order to raise the head module 1 somewhat from the floor or ground. Simultaneously the roll motor 170 straightens the head module (13B), after which motor 165 is released in order to again place the head module M1 on the ground. The following modules are straightened by identical actions after having also raised the rear chassis 8 of the previously raised module in order to better raise the following modules from the ground (13C). Finally, the tail module (M3) according to FIG. 13D, is raised by actuating the motors of hinge 20 joining same to the preceeding module, whose rear chassis 8 is also raised.

It is obvious that various arrangements made with respect to the modules M and the articulated vehicle formed by them are not always indispensable and that their presence or absence must be decided as a function of the obstacle types encountered. On a completely smooth, flat ground or floor, there is no need for a chassis constituted by two parts in relative rotation, degrees of twisting freedom and regulation of the inclination of the platform and load, as can be deduced from the absence of particular comments in FIG. 10. The suction cups 127 or motors fixed to hinges 20 can also be omitted. The requested protection is defined by the claims only.

Numerous different missions can be given to the vehicle, such as the handling of loads, exploration, inspection or working in hostile or dangerous environments, whereby the vehicle can be completely autonomous or can be accompanied by personnel on which it is then dependent. Working can take place within buildings or on various natural ground surfaces. FIG. 11 shows in the most expressive manner from this standpoint the extinguishing of a fire in a building. The container 69 is designed as a function thereof and can e.g. be provided with manipulatable tools, instruments and measuring electronics, optical systems, tanks or even compartments for large modules.

We claim:

1. A modular element for an articulated vehicle, comprising a generally rectangular chassis (6) made of a front portion (7) and a rear portion (8) linked together through an articulation about a transverse axis (X), a pair of left and right concurrent, transverse axles (3) extending through said axis (X) for supporting the chassis, a pair of support wheels (1,2), each wheel being rotatably attached to an outer end of each of said axles, a platform (9) supported by said axles, said platform (9) being rotatably connected to the inner end of said left axle by a bearing (30) and fixedly connected to the inner end of said right axle, said front portion (7) being rotatably connected to said left and right axles, said rear portion (8) being fixedly connected to said left axle and rotatably connected to said right axle, selectively engageable motors (35,36) for driving said pair of wheels (1,2), and a regulating system including at least one inclination detector (71,72) fixedly mounted on said platform, a chassis motor (39) for rotating said left axle, and a platform motor (41) for rotating said right axle, each portion of the chassis carrying two vertically axed articulations (111 to 114) located at left and right sides of said front and rear portions, said articulations serving to receive one end of articulated bars (93,94), the other end of which is received in similar articulations of another adjacent modular element.

2. The modular element of the articulated vehicle according to claim 1, wherein the articulations for the articulated bars are located on respective cross-beams (91,92) on front and rear portions of the chassis, one of the cross-beams (91) pivoting with respect to the chassis about a horizontal axis perpendicular to the axles (3) and located midway between the left and right articulations.

3. The modular element of the articulated vehicle according to claim 2, further comprising a system (75,76) for blocking the pivoting of a cross-beam (91) with respect to said chassis (6).

4. The articulated vehicle having several articulated vehicle modular elements (M) according to claim 1, assembled in chain-like manner, so as to define a head module, a tail module and intermediate modules, couplings assembling the same and each constituted by said two articulated bars (93,94) at the two ends, the first bar (94) on the left vertically axed articulation (111) of the rear portion of the chassis of a front vehicle module and on the right vertically axed articulation (114) of the front portion of the chassis of a rear vehicle module, the second bar (93) on the right vertically axed articulation (112) of the rear portion of the chassis of the front vehicle module and on the left vertically axed articulation (113) of the front portion of the chassis of the rear vehicle module, as well as an overall control system making it possible to act on the motors and control their disengagement.

5. The modular articulated vehicle according to claim 4, wherein the articulated bars (93,94) are attached to their articulations in vertical translation and thus enable a module (M) to be supported or raised by adjacent modules (M).

6. The modular articulated vehicle according to claim 5, characterized in that the articulated bars are hollow and contain connecting ducts (98) joining the modular elements to which they are coupled.

7. The modular articulated vehicle according to claim 6, characterized in that it comprises actuators (164,165,170) on couplings making it possible to modify roll and yaw angles (A) between the two modular elements connected by the couplings.

* * * * *